(12) United States Patent
Kraibühler et al.

(10) Patent No.: US 10,040,249 B2
(45) Date of Patent: Aug. 7, 2018

(54) METHOD FOR PRODUCING A THREE-DIMENSIONAL OBJECT BY MEANS OF GENERATIVE CONSTRUCTION

(71) Applicant: ARBURG GMBH + CO KG, Lossburg (DE)

(72) Inventors: Herbert Kraibühler, Lossburg (DE); Eberhard Duffner, Starzach (DE); Oliver Kessling, Lossburg-Lembach (DE)

(73) Assignee: ARBURG GMBH + CO KG, Lossburg (DE)

( * ) Notice: Subject to any disclaimer, the term of this patent is extended or adjusted under 35 U.S.C. 154(b) by 252 days.

(21) Appl. No.: 14/770,517

(22) PCT Filed: Feb. 21, 2014

(86) PCT No.: PCT/EP2014/000460
§ 371 (c)(1),
(2) Date: Aug. 26, 2015

(87) PCT Pub. No.: WO2014/131500
PCT Pub. Date: Sep. 4, 2014

(65) Prior Publication Data
US 2016/0009026 A1    Jan. 14, 2016

(30) Foreign Application Priority Data
Feb. 26, 2013 (DE) .................. 10 2013 003 167

(51) Int. Cl.
*B29C 67/00* (2017.01)
*B29C 64/106* (2017.01)
(Continued)

(52) U.S. Cl.
CPC .......... *B29C 67/0055* (2013.01); *B29C 64/10* (2017.08); *B29C 64/106* (2017.08);
(Continued)

(58) Field of Classification Search
CPC ..... B29C 45/461; B29C 64/10; B29C 64/106; B29C 64/112; B29C 64/118;
(Continued)

(56) References Cited

U.S. PATENT DOCUMENTS

| 2004/0085377 A1* | 5/2004 | Nielsen | .................. B33Y 30/00 |
| | | | 347/19 |
| 2013/0071599 A1* | 3/2013 | Kraibuhler | ............ B29C 64/112 |
| | | | 264/401 X |

FOREIGN PATENT DOCUMENTS

| DE | 102011109368 A1 | 2/2013 |
| DE | 102011109369 A1 | 2/2013 |

(Continued)

OTHER PUBLICATIONS

Machine translation of EP 1886793 A1 (published on Feb. 13, 2008).*
(Continued)

*Primary Examiner* — Leo B Tentoni
(74) *Attorney, Agent, or Firm* — Cantor Colburn LLP

(57) ABSTRACT

The invention relates to a method for producing a three-dimensional object (50) by means of generative construction in a direct constructional sequence from at least one solidifiable material. At least one material component is discharged in a programmable way via a control device in the direct constructional sequence and, as a result of the discharge, produces structurally different regions of the object (50) that are joined together, wherein geometric relationships obtained during the discharge already correspond to the object (50). The fact that configuration criteria for the structurally different regions of the object (50) are predefined to the control device by using a selection, and that the discharge unit is controlled by the control device during the discharge of the at least one material component for the structurally different regions of the object by using the
(Continued)

selected configuration criteria in order to configure a three-dimensional structure desired for the respective region of the object, means that a method is provided by means of which the discharge of the material can be carried out in accordance with individual requirements on the object.

12 Claims, 4 Drawing Sheets

(51) Int. Cl.
  *B29C 64/209* (2017.01)
  *B29C 64/118* (2017.01)
  *B29C 64/10* (2017.01)
  *B29C 64/112* (2017.01)
  B29C 45/46 (2006.01)
  B33Y 10/00 (2015.01)
  B29L 9/00 (2006.01)

(52) U.S. Cl.
  CPC .......... *B29C 64/112* (2017.08); *B29C 64/118* (2017.08); *B29C 64/209* (2017.08); *B29C 67/0059* (2013.01); *B29C 67/0088* (2013.01); *B29C 45/461* (2013.01); *B29L 2009/00* (2013.01); *B33Y 10/00* (2014.12)

(58) Field of Classification Search
  CPC ....... B29C 64/209; B33Y 10/00; B33Y 40/00; B33Y 50/00; B33Y 50/02
  USPC .......................................... 264/40.1, 40.7, 308
  See application file for complete search history.

(56) References Cited

FOREIGN PATENT DOCUMENTS

| EP | 1442869 A1 | 8/2004 |
|----|------------|--------|
| EP | 1886793 A1 | 2/2008 |
| EP | 2266782 A1 | 12/2010 |
| WO | 2009013751 A2 | 1/2009 |
| WO | 20130172278 A1 | 2/2013 |

OTHER PUBLICATIONS

Alexander Pasko, "Procedural function-based modelling of volumetric microstructures", Graphical Models 73 (2011) 165-181.

Gary Hodgson, "Thoughts on Fill Algorithms", Jan. 3, 2012 pp. 1-6, Internet URL: http://garyhodgson.com/reprap/2012/01/thoughts-on-fill-algorithms, XP0022725374.

H. Brooks, "Variable Fused Deposition Modelling—Concept Design and Tool Path Generation", Jun. 2011, pp. 1-10 XP002725372.

International Search Report for corresponding application PCT/EP2014/000460 filed Feb. 21, 2014; dated Jun. 23, 2014.

Richard Home, "Slic3r is Nicer—Part 1 Settings and Extruder Calibration" Jan. 6, 2012, pp. 1-12, Internet URL; http://richrap.blogspot.de/2012/01/slic3r-is-nicer-part-1-settings-and.html.

* cited by examiner

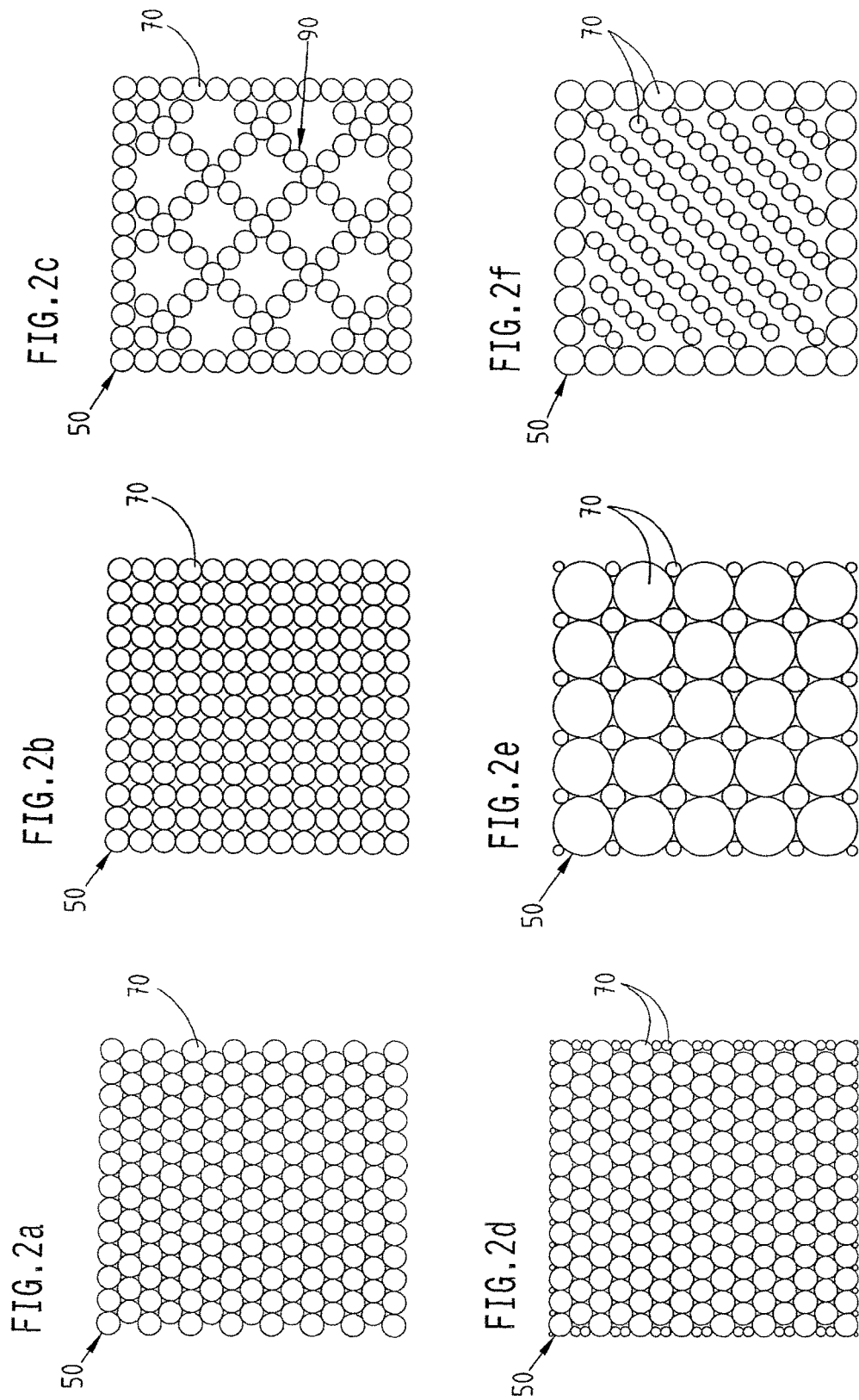

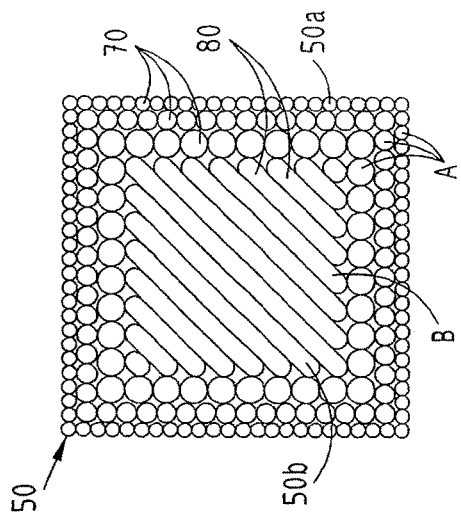
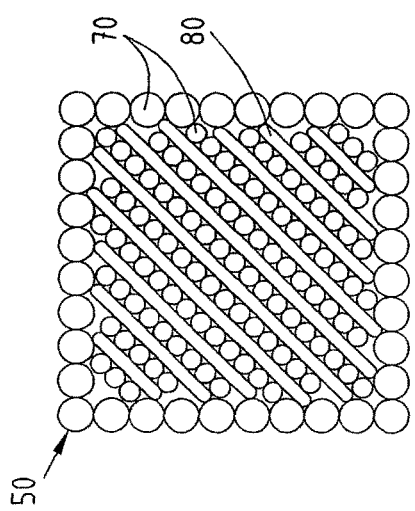
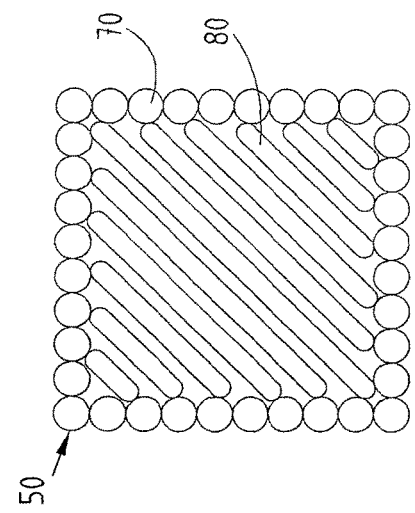
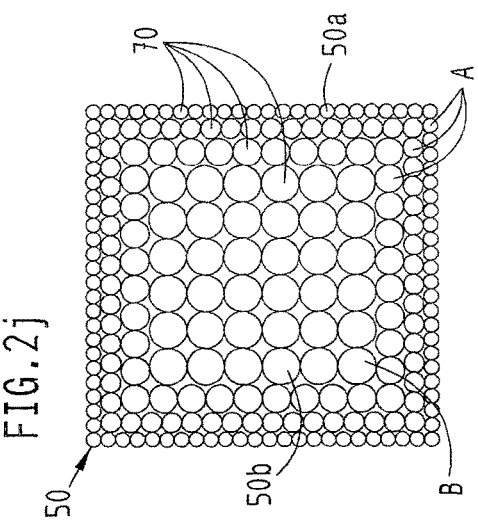

METHOD FOR PRODUCING A THREE-DIMENSIONAL OBJECT BY MEANS OF GENERATIVE CONSTRUCTION

CROSS REFERENCE TO RELATED APPLICATIONS

The present application is claiming the priority of the German patent application 10 2013 003 167.2, filed on 26 Feb. 2013, the entire content of which is herein incorporated by reference.

TECHNICAL FIELD

The invention relates to a method for producing a three-dimensional object by means of additive construction, from at least one solidifiable material.

In the context of this application, the term "spatial structure" is used in the sense of describing structures within a spatially delimited region of an object, which structures are influenceable by particular measures. This is best explained with reference to an example, as illustrated in FIG. 2g. There, a square 50 of the object is visible as a section through the object, which has an outer contour, here comprising individual drops in the manner of a pattern of dots, and an inner filling resembling lines. The outer contour forms a spatial structure, as does the inner contour. Whereas in the case of the outer contour for example the important point may be that a good surface is ensured with correspondingly little roughness, or good appearance of the outer skin, in the inner region the important point is to fill the surface area as efficiently as possible. The spatial structure is configured in that a change is effected for example in the manner of application, in that extremely small droplets are placed against each other for example in the outer region, while in the inner region the material is discharged using relatively large drops and/or a continuous strand.

BACKGROUND

WO 2013/017278 A1 discloses such a method for producing a three-dimensional object from a solidifiable material, such as conventional plastics, which is liquefied in a manner similar to injection molding by way of a plastifying unit and then discharged drop by drop. The drops may be placed adjoining each other such that a connection or interfacial regions are established in which adjacent materials abut against each other. This has no effect on how the spatial structure of the individual materials is created. It is known from DE 10 2011 109 369 A1 to strengthen structures in the case of this method by embedding fiber elements.

A method which falls under rapid prototyping is known from WO 2009/013751 A2. There, under the term of "solid freeform fabrication", paragraphs (0003) and (0004) list methods for production directly from computer data, which include for example three-dimensional printing, electron beam melting, stereolithography, selective laser sintering, laminated object manufacturing and FDM methods—that is to say, however, in which at best a small pressure is applied when discharging the material. In these methods, according to FIG. 8 in that document, it is possible to produce adjacent structures from different materials. However, the application is not performed by placing drop against adjoining drop or drop against strand but by applying solid materials and then post-treating or, with additional energy input, curing them (paragraph (0005)). This also results, on the one hand, in the case of different materials in uneven shrinkage of the object, so that the geometry applied does not correspond either in the interior or in respect of the external dimensions to the cured geometry. There are no configuration criteria for determining the respectively desired spatial structure, and indeed even in these conditions they would be difficult to observe.

EP 1 442 869 A1 discloses dividing into individual cells a data set of an object to be produced, and processing these structural elements differently from one cell to the next when the object is constructed.

In the production of plastics parts, high-quality parts of this kind can be satisfactorily produced in large batch sizes by injection molding or extrusion. The advantage of in particular injection molding lies specifically in the fact that high-precision production of complex part geometries is possible. However, if it is a matter of producing parts in relatively small numbers, that is to say for example singly or in small batch sizes, such as patterns with the demand for fast preparation and properties similar to those of injection-molded parts, other manufacturing methods are used, and these are widely known by the term prototyping and rapid manufacturing. Such parts are produced without tools, that is to say without molds, and in most cases on the basis of the generation of the geometry from 3D data. However, previous methods, such as melting powder coatings by the application of heat for example by means of laser, or printing methods with a different form of binding for the powder parts, do not allow the spatial structure to be individually produced or influenced.

BRIEF SUMMARY

Taking this prior art as a starting point, a method is provided for producing a three-dimensional object by means of which the material may be applied in accordance with the individual demands made of the object.

To produce the object, structurally different regions are defined on the object, for which regions the material is programmably discharged for creating selected spatial structures. As a result of this programming, it is possible to influence the manner of material discharge, for free generation of the 3D geometry such that account can be taken of the respectively desired property in the spatial structure concerned. In contrast to plastics injection molding, it is possible in this way to directly influence the flow behavior of the material when the space or the spatial structure is formed. While, in plastics injection molding, the flow behavior is necessarily predetermined as a result of the rheology, in this case it is possible to influence the distribution of the material such that drops of different size or indeed other structures, such as strands, may be discharged successively or indeed if necessary alternately. Depending on the drop size or indeed the duration of discharge, different structures thus result, which occupy a certain space within the object and form a spatial structure. As a result, it is then conversely possible to influence the spatial structure and hence the geometric and/or mechanical properties of the object, locally in certain regions, by way of influencing factors that have an influence on this material discharge.

The material is discharged directly from a pressurized or pressurizable material reservoir, preferably drop by drop. The pressure in this case is preferably at a level as known from plastics injection molding technology, that is to say at least 10 MPa to 100 MPa. At the same time, these drops form the final geometry, preferably also already in the interior of the object, that is to say at points which can no longer be reached after the object has been produced by this method and which would hence also have to forgo post-treatment. Since the final geometry is already created during discharge, however, this is no more necessary. Specifically, the pressure supports this effect, since the material is joined together, in a manner similar to injection molding, except that in that case the pressure is maintained in the mold cavity inside the mold. This joining together with positive engagement is presumably a consequence of discharging the material under pressure and a simultaneous flowing together of the drops, at the point of application on the object to be produced.

The use of a plastifying unit that is known per se, as used in plastics injection molding, gives the advantage that standard materials known from injection molding technology, which are readily and inexpensively available throughout the world, can also be processed.

Preferably, only a single material is applied, using one or more discharge units. However, it is also possible to use a plurality of materials having a plurality of discharge units. In all cases, the configuration criteria may be used to influence the manner of application, the size and quantity of the material to be applied, or indeed the duration of application. Similarly, however, it is also possible to operate simultaneously or serially a plurality of discharge units which differ for example in that they are either controlled by different configuration criteria and/or have different geometric relationships in the region of the outlet opening or, as mentioned, apply different materials.

Preferably, the configuration criteria include influencing variables for material discharge that have an influence on the quantity of material to be applied for example according to its size, or indeed the duration of application, with the result that only drops for example of different sizes or only a continuous thread is/are discharged, or there is an alternation between these types of discharge. Influencing variables that may be used as configuration criteria are for example the pressure on the material component, the opening and closing time of a cyclable outlet opening, the temperature of the material, the diameter of the outlet opening, the opening stroke of the closure mechanism of the outlet opening, or the ratio of the travel of the conveying means to the quantity to be applied.

Depending on the demands made of the component part, it is possible to generate, within the spatial structure, homogeneous and/or closest packing of spheres or indeed grid or screen structures or, for example to influence distortion or the strength of an object, it is possible to perform an angular offset alternately from one layer to the next in order to generate a certain filling pattern. With this strategy it is possible to influence in particular the roughness and appearance of the outer skin, the rate of construction when filling internal volumes, the technical quality such as the distortion or the strength, or indeed specifically to create a porosity, such as in the case of a filter.

Further advantages will become apparent from the subclaims and the description below of preferred exemplary embodiments.

BRIEF DESCRIPTION OF THE FIGURES

The invention will be explained in more detail below on the basis of exemplary embodiments. In the Figures:

FIGS. 2a, 2b show an illustration of drops in two successive layers, with and without offset, FIG. 2c shows the filling of a spatial structure by a grid structure, FIG. 2d shows the filling of a square object having an outer contour, FIG. 2e shows the filling of a surface with drops of different diameters, FIGS. 2f, 2g show the filling of a spatial structure with drops and threads respectively, and FIGS. 2h-2j show the configuration of further spatial structures.

DETAILED DESCRIPTION

Figure 1:
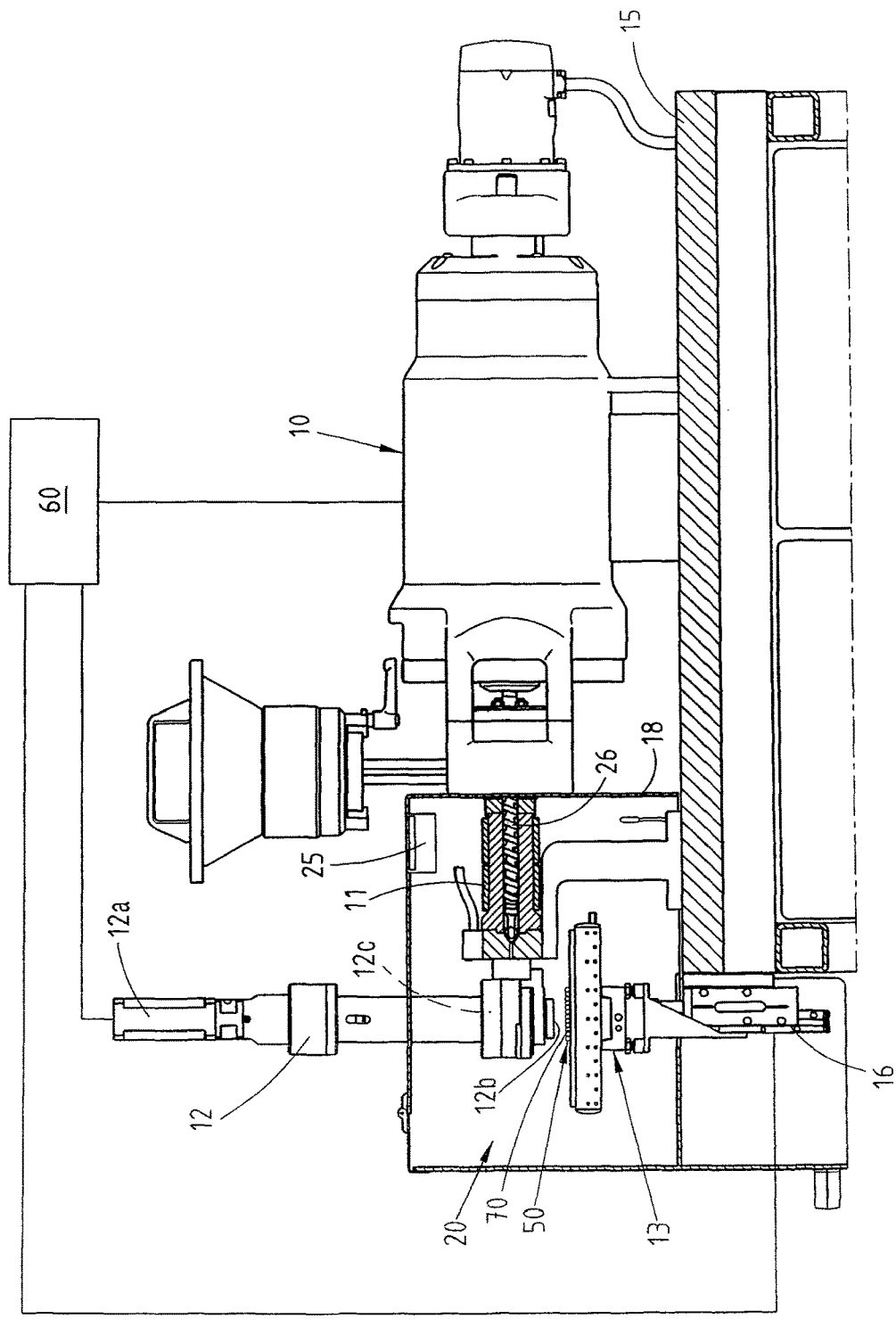
FIG. 1 shows a side view, partly in section, of a device for producing a three-dimensional object.

The invention will now be explained in more detail by way of example, with reference to the attached drawings. However, the exemplary embodiments are only examples, which are not intended to restrict the inventive concept to a particular arrangement. Before the invention is described in detail, it should be pointed out that it is not restricted to the respective component parts of the device and the respective method steps, since these component parts and methods may vary. The terms used here are merely intended to describe particular embodiments and are not used restrictively. Moreover, where the singular or indefinite articles are used in the description or claims, this also includes the plurality of these elements provided the overall context does not unambiguously indicate otherwise.

Before discussing the method sequence and the objects 50 according to FIGS. 2a to 2j that are to be produced in this way, first a device for producing a three-dimensional object by means of additive construction in a direct construction sequence from at least one solidifiable material according to FIG. 1 will be explained. The material, which is liquefied for processing and which hardens after being applied through a discharge unit 12, serves to produce a three-dimensional object. For this purpose, drops 70 or indeed strands 80 or threads may be discharged, depending on the influence of the device. The object may for example be produced in that, according to FIG. 1, drops 70 are discharged sequentially from an outlet opening 12b of a discharge unit 12, with the result that the object 50 is created layer by layer on an object support 13 in the construction space 20, this object support being movable relative to the outlet opening 12b by a drive unit 16. As an addition to the discharge unit 12, according to FIG. 1a it is also possible for a further discharge unit 12' having an associated drive part 12a' and material reservoir 12c' to be provided.

Since the type of material and its processing are crucial for the result of the method, that is to say for the quality of the object to be produced, this will be discussed in detail. The solidifiable material is a plastified material such as silicone, or a plastifiable material such as thermoplastics or indeed materials in powder form. The material may also be a material which is reversibly meltable when heated and is hence recyclable. Any other desired materials may be used provided these materials are plastifiable by the device and primarily provided they are dischargeable through the at least one discharge unit 12. In this context conventional materials that are used as material in plastics injection molding may be considered, that is to say there is no need to resort to expensive special materials. The use of a plastifying or injection molding unit that is known per se, as used in the injection molding of plastics, for preparing the solidifiable material as a fluid phase, gives the advantage that standard materials known from injection molding technology, which are readily and inexpensively available throughout the world, can also be processed.

In the fluid phase, the solidifiable material has a so-called laminar supply flow. Among other things, the deposition of the melt against the wall influences the supply flow. This becomes clearest on considering what is learned from injection molding technology. When the mold of a simple rectangular channel is filled, the melt is injected by way of a so-called gate and begins to spread out from this point in a circle with continuous flow fronts until it occupies the entire width of the cavity. Sometime thereafter, the region between the inlet and the flow front may be regarded as more or less formed. At the flow front itself a particular flow situation prevails, the "supply flow", since the flow lines in this region appear as a supply when considered in relation to a coordinate system moving with it. The melt flows between two mass layers that lie close to the cavity surfaces and have solidified rapidly, wherein the melt progresses towards the flow front at greater speed in the center of the cavity. Just before the melt reaches the flow front, it loses speed in the direction of flow and flows obliquely in relation to the wall until it butts against the wall.

On the one hand, the laminar supply flow is advantageous to the generation of drops 70 that are 'aligned' with the object support 14, because of its laminar form; on the other hand, and particularly when forming small drops, it is precisely here that the problems arise that make it difficult to implement with apparatus and materials known from injection molding technology. Adhesion to the wall has the result that the masses can only with great difficulty be formed into drops having the desired small volumes, preferably in the range of less than or equal to 1 mm$^3$, particularly preferably in the range of from 0.01 to 0.5 mm$^3$, and the desired flying speed; on the other hand, a correspondingly high viscosity of the material is specifically significant for the formation of a suitable drop shape of a discontinuous drop.

This distinguishes the materials used also from the previously known waxes. Because of their viscosity, waxes can be applied in normal thermal printing or inkjet methods, that is to say by a simple kinematic unpressurised acceleration, without a difference in pressure in the molten drop. The materials used here already differ from this in that their viscosity number is greater by one to a plurality of orders of magnitude. Thus, the dynamic viscosity number of the solidifiable material is between 100 and 10 000 [Pa s], wherein preferably the solidifiable material is a plastic conventional in injection molding technology, or a resin. This requires processing from a pressurizable material reservoir 12, since pressures of more than 10 to 100 MPa (100 to 1 000 bar) are routinely required, in particular if small outlet openings 20 are used for obtaining small drop volumes.

In practice, however, it is found that it is specifically this procedure and the pressure that, when producing three-dimensional objects, contribute to the establishing of results that were not achievable hitherto. The material is discharged, preferably drop by drop, directly out of the material reservoir 12c' that is subjected or subjectable to the said pressure. At the same time, these drops form the final geometry, already in the interior of the object 50, that is to say at points which can no longer be reached after the object has been produced by this method and which would hence also have to forgo post-treatment. Since the final geometry is already created during discharge, however, this is also not necessary.

Specifically, the pressure supports the construction of the final geometry, since the material is joined together, in a manner similar to injection molding, except that in that case the pressure is maintained in the mold cavity inside the mold. This joining together with positive engagement is presumably a consequence of discharging the material under pressure and a simultaneous flowing together of the drops, at the point of application on the object to be produced.

This material is plastified or prepared in the preparation unit 11, which is arranged on a machine bed 15, and is pressurized by the pressure generation unit 10. Like mass temperature, clock rate or cyclic motion of the outlet opening 12b, the pressure determines the formation and size of the drops and hence also the quality of the object to be produced. The desired volume of the drop 70 is in particular in the range of from 0.01 to 1 mm$^3$. The diameter of the outlet opening 12b is in particular ≤1 mm, preferably approximately 0.1 mm. With a drop diameter of 100 μm, the drop volume will be approximately 0.0005 mm$^3$.

Within the discharge unit 12 there is a material reservoir 12c from which the material is discharged, as a material component A, in the direction of the object 50 by way of an outlet opening 12b actuated by a drive part 12a. Below, the invention will be described with reference to the preferred embodiment, in which only one material component is discharged. However, it is also possible to discharge a plurality of material components. Preferably, a flexure joint according to DE 10 2009 030 099 B1 may be used as an orifice at the outlet opening 12b.

According to the method, the three-dimensional object is produced by the correspondingly liquefied material, which after being applied through the discharge unit 12 hardens at the object support 13 or the object 50 and hence builds up the object 50 piece by piece. The material component A (FIG. 2j) is discharged in the direct construction sequence in a manner programmable by way of a control apparatus 60. Here, and already as a result of the pressurized discharge, the material is joined together such that structurally different regions of the object 50 may be generated. The geometric relationships that are obtained during discharge of the material already correspond to the final object 50, both on the exterior and in the interior. Thus, the physical structure is obtained in a direct manner, which is also significant in that once the object has been finished there is no longer any access to the internal spatial structures. Nonetheless, it is possible in this way to optimize support or screen structures or weight-saving inner configurations, since the designer can deliberately take the final arrangement of these elements into account already when establishing the data for the object. As a result, properties such as flexural properties or diffusion capacity may be planned, dimensioned and produced in certain regions, differing from one spatial structure to the next.

Configuration criteria for creating the spatial structure are predetermined for the structurally different regions of the object 50 and transmitted to the control apparatus 60. On the basis of these configuration criteria, the discharge unit 12 is controlled by the control apparatus 60, during discharge of the at least one material component A for producing structurally different regions of the object 50, on the basis of these configuration criteria for configuring a spatial structure which is desired for the respective region of the object and hence where appropriate in a different manner from one region of the object to the next. Thus, according to FIG. 1, the control apparatus has a particular influence on the material preparation by the preparation unit 10, the discharge unit 12 and also on the object support 13, which positions and moves the object in relation to the discharge unit 12. The different regions of the object 50 may be generated from one and the same material component A but also from a plurality of material components.

The configuration criteria include in particular the quantity of material component to be discharged in order to influence for example the size of the drops, or indeed to generate a continuous strand or thread. At the same time or as an alternative, the duration of discharge may also be used as a configuration criterion and influence the material. Further influencing variables that may be used as configuration criteria for creating the spatial criteria and influence the material component are in particular:

- the pressure on the material component in the material reservoir 12c inside the discharge unit, since the greater the pressure the larger the drops that can be generated,
- the opening time and closing time of the cyclable outlet opening 12b of the discharge unit 12, since with a longer opening time larger drops 70 are similarly produced,
- the temperature of the material component to be applied, since in this way the viscosity and hence the flowability of the material may be influenced such that if the flowability is relatively great it is also possible to apply material threads,
- the opening stroke of a drive part 12a for the closure mechanism of the cyclable outlet opening 12b, since with a larger stroke the size of the drops 70 or the quantity of material to be discharged also increases,
- the ratio of the travel of a conveying means 26 such as the screw illustrated in FIG. 1 to the quantity to be applied, since this allows to determine a key figure that influences the size and regularity of the drops to be determined,
- the continuity of application, since gaps may be specifically set by interrupting or strands 80 may be applied with continuous opening.

Figure 1A:
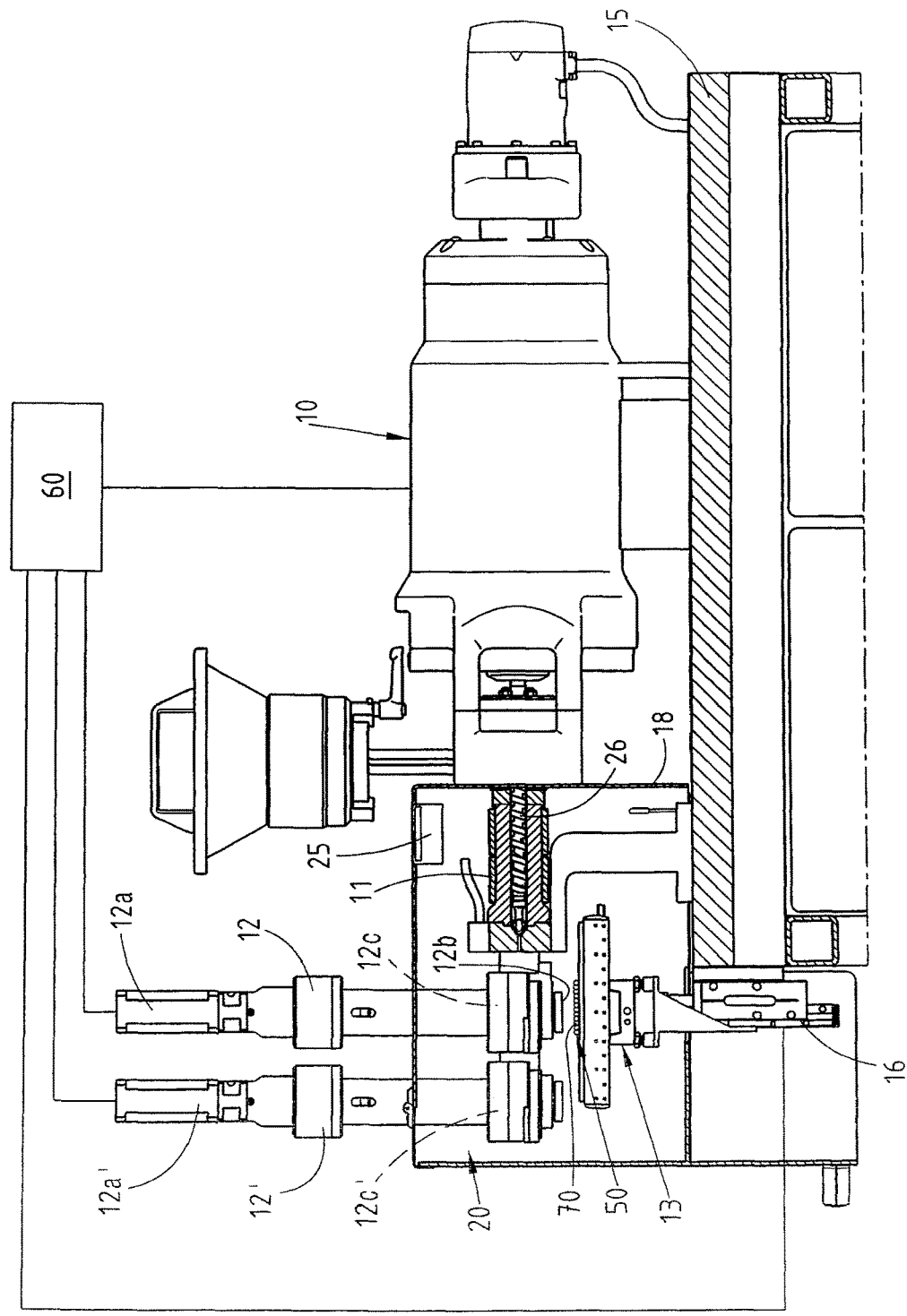
FIG. 1a shows an illustration according to FIG. 1, having a plurality of discharge units.

As far as the device is concerned, it is also possible to use as a configuration criterion different diameters of the outlet opening at different discharge units 12, 12', such that depending on the control of the one or the other discharge unit it is also possible to alter the drop size or strand thickness. However, configuration criteria also include the quality demands made of the object, such as roughness, density, surface quality, weight or geometry of the spatial structure, since—for example according to FIG. 2a—successive layers may be offset from each other, by contrast with an application with no offset according to FIG. 2b, such that they are applied in an offset arrangement or indeed are applied with an angular offset of for example 90 degrees in order to influence the tension and strength of the component part, in particular in the interior, that is to say when it is filled with a spatial structure. It is possible, as a configuration criterion that influences the quality of the object, to specifically influence the spatial structure in such a way that gaps—if there are any—are produced in the component part and not close to the contour (e.g. FIG. 2j). This is primarily advantageous for component parts with a fine structure and having acute angles in order to prevent for example later weak points in the object.

Where necessary, it is possible—according to FIG. 1a—to discharge one or more material components A, B (FIG. 2j) from a plurality of discharge units 12, 12', that is to say also more than just one material component. In that case, these may each be controlled individually and quite differently by the control apparatus 60, depending on which configuration criteria are applied. In addition or as an alternative, different geometric relationships may be applied, in particular in the region of the outlet opening 12b of the respective discharge unit 12, 12', in order in this way to influence the type of application.

Of course, the use of for example two discharge units 12 also allows a so-called sandwich construction to be implemented, similar to that known from injection molding technology, in order for example to use high-quality material in the outer region and less expensive material in the inner region, that is to say in the inner spatial structure, or in order to generate for example different properties of barrier layers. It is then possible for the discharge to be performed to use the two discharge units alternately or, depending on the spatial structure, also at the same time. For creating a spatial structure, in particular for the filling of bodies, it is possible—according to FIG. 1—for the at least one material component to be discharged drop by drop to generate a homogeneous and/or a closest packing of spheres—according to FIGS. 2a, 2b. The drops 70 are in this case offset from each other for example in successive layers. Further, FIG. 2d indicates that a relatively small drop, of around 50% the size, may also fill a gap.

According to FIG. 2c, within the spatial structure it is possible to discharge the at least one material component A to generate a grid structure 90. This allows the packing density and hence the weight of an object 50 to be minimized. As a particular embodiment, a honeycomb structure is for example also conceivable, and it is also possible to increase the porosity in this region and hence to produce a screen structure. In this way an object 50 may be produced efficiently and without sacrifices in quality in respect of the desired properties of the component part.

FIG. 2i shows the exemplary filling of a square object 50 having an outer spatial structure 50a and an inner spatial structure 50b. Preferably, first of all the outer contours of the outer spatial structure 50b are generated in a plane, dot by dot or drop by drop, wherein the work is carried out to give a correspondingly smooth surface, that is to say that the drops applied are as small as possible. In practice, however, an improvement is already seen in the surface quality even with drops of the same size. This improvement in the surface quality is achieved as a result of the defined discharge of the contour. Then, the filling of the same plane or layer is introduced, by strands 80 or threads, within the inner spatial structure 50b at an angle of for example 45 degrees. This angle may be offset from one layer or plane to the next for example by 90 degrees in order thereby to give the object torsional strength. In other words, by way of example, the box according to FIG. 2i is divided into layers. Here, a distinction is made between the contour (outer spatial structure 50a) and the actual filling (inner spatial structure 50b). The sequence of producing the plane may be selected as desired, that is to say it is possible to generate first the outer contour and then the filling, or it is equally possible to generate first the filling and then the outer contour. It is also conceivable to follow the outer contour multiple times or indeed to alternate the sequence in which the outer contour is followed. Preferably, the filling pattern is offset by a specified angle from one layer to the next. FIG. 2j shows the same structure with the strands in the interior in FIG. 2i replaced by relatively large drops 70.

By influencing the configuration criteria it is also possible to achieve a construction according to FIG. 2e, in which drops 70 of different sizes are arranged within a spatial structure such that optimum filling is produced.

In principle, by influencing the configuration criteria it is possible to achieve discharge of only drops 70 or a strand 80 or both alternately. As desired, it is thus possible to achieve shapes according to FIG. 2f, 2g or 2h within the spatial structure.

If a plurality of material components A, B are used, in particular when using a plurality of discharge units 12, 12' as in FIG. 2j, it is possible, for example by means of a material which is removed afterwards by being washed out using a suitable solvent, to achieve a filling and in this way to produce structures with overhanging elements. Similarly, it is possible to use a material for filling which can be broken away afterwards. In this arrangement, by using suitable configuration criteria it is possible to influence the geometries such that a particular filling strategy is produced for the various materials, with the result that as little material as possible is required as the support material for overhanging elements.

A consideration of potential gaps that may occur primarily when filling a spatial structure is also taken into account as a configuration criterion. To improve the surface quality, it is ensured here that gaps—if there are any—are produced in the component part and not close to the contour.

It will be understood that this description may be subject to the greatest variety of modifications, alterations and adaptations that are within the range of equivalents to the appended claims.

The invention claimed is:

1. A method for producing a three-dimensional object by means of additive construction in a direct construction sequence from at least one solidifiable material, which, for processing, is liquefied into a fluid phase by means of a plastifying unit, that is known per se in the prior art and as it is used in plastics injection molding, and which hardens after being applied from a discharge unit,
   wherein the at least one solidifiable material for discharging drops is subject to a pressure in a material reservoir of at least 10 MPa,
   wherein at least one material component of the at least one solidifiable material is discharged under the pressure in the direct construction sequence in a manner programmable by way of a control apparatus, wherein already parts of the at least one material component are mated with each other as a result of a discharge, and wherein the at least one material component produces structurally different regions of the three-dimensional object,
   wherein geometric relationships that are obtained during the discharge of the fluid phase of the at least one solidifiable material already correspond to the final geometric relationships of the three-dimensional object,
   wherein configuration criteria for the structurally different regions of the object are predetermined and transmitted to the control apparatus on the basis of a selection as selected configuration criteria,
   wherein the discharge unit is controlled by the control apparatus, during the discharge of the at least one material component for the different regions of the object, on the basis of the selected configuration criteria for configuring a spatial structure which is desired for the respective region of the object,
   wherein, within the spatial structure, the at least one material component is applied drop by drop to produce a homogeneous and/or closest packing of spheres, and
   wherein therewith the final geometric relationships are obtained externally and also inside the three-dimensional object,
   wherein the final geometric relationships determine the inner physical structure of the object when discharging the solidifiable material.

2. A method according to claim 1, wherein the drops are discharged in a volume of less than or equal to 1 mm$^3$.

3. A method according to claim 2, wherein the drops are discharged in a volume in a range of from 0.01 to 0.5 mm$^3$.

4. A method according to claim 1, the different regions of the object are produced from one and the same of the at least one material component.

5. A method according to claim 1, wherein the configuration criteria include a quantity of the at least one material component (A) to be applied, according to its size and/or a duration of application.

6. A method according to claim 1, wherein the configuration criteria include at least one of the following influencing variables of at least one of the at least one material component and the device for producing the object:
   a pressure on the at least one material component in the material reservoir,
   an opening time and closing time of a cyclable outlet opening (12b) of the discharge unit,
   a temperature of the at least one material component to be applied,
   an opening stroke of a drive part of a closure mechanism for the cyclable outlet opening,
   a ratio of a travel of a conveying means to a quantity to be applied,
   a continuity of application,
   a diameter of the cyclable outlet opening.

7. A method according to claim 1, wherein the configuration criteria include at least one of the geometric relationships of the spatial structure and quality requirements made of the object.

8. A method according to claim 1, wherein the at least one material component is applied through a plurality of discharge units which are controlled by the control apparatus by different configuration criteria.

9. A method according to claim 8, wherein the plurality of discharge units have different geometric relationships at the outlet opening.

10. A method according to claim 1, wherein, within the spatial structure, the at least one material component is applied to produce a grid structure or screen structure.

11. A method according to claim 1, wherein, within the spatial structure, there is an alternation between a discontinuous application of the drops and a continuous application of a strand.

12. A method according to claim 1, wherein, within the spatial structure, a filling pattern is generated which is applied from one layer to the next with an angular offset.

* * * * *